(12) United States Patent
Terai

(10) Patent No.: US 11,897,332 B2
(45) Date of Patent: Feb. 13, 2024

(54) WHEELIE SUPPRESSING CONTROL UNIT

(71) Applicant: KAWASAKI MOTORS, LTD., Akashi (JP)

(72) Inventor: Shohei Terai, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 777 days.

(21) Appl. No.: 16/996,081

(22) Filed: Aug. 18, 2020

(65) Prior Publication Data

US 2021/0061099 A1     Mar. 4, 2021

(30) Foreign Application Priority Data

Sep. 4, 2019   (JP) ................................. 2019-160914

(51) Int. Cl.
*B60K 28/10* (2006.01)
*B62J 27/00* (2020.01)
*B62J 45/415* (2020.01)

(52) U.S. Cl.
CPC ............... *B60K 28/10* (2013.01); *B62J 27/00* (2013.01); *B62J 45/4152* (2020.02); *B60Y 2200/12* (2013.01); *B60Y 2300/26* (2013.01)

(58) Field of Classification Search
CPC ....... B60K 28/10; B62J 27/00; B62J 45/4152; B60W 10/06; B60W 40/11; B60W 2030/041; B60W 2300/36; B60W 2520/28; B60W 2540/10; B60W 2710/0605; B60W 30/02; B60W 30/18027; B62K 11/04; B60Y 2200/12; B60Y 2300/26
See application file for complete search history.

(56) References Cited

U.S. PATENT DOCUMENTS

2011/0160973 A1*  6/2011  Matsuda ................. B60T 8/175
                                                                  701/70
2013/0261925 A1* 10/2013  Kobayashi ............. B60K 28/16
                                                                  701/84
(Continued)

FOREIGN PATENT DOCUMENTS

JP      2009214855 A     9/2009
JP      2011137416 A     7/2011
(Continued)

*Primary Examiner* — Anshul Sood
*Assistant Examiner* — Micah Chuen-Him Cheng
(74) *Attorney, Agent, or Firm* — Alleman Hall & Tuttle LLP

(57) ABSTRACT

A wheelie suppressing control unit includes: a first determiner that determines whether a vehicle is in a traveling state satisfying a first condition representing a wheelie state; a second determiner that determines whether the vehicle is in a traveling state satisfying a second condition representing a pre-wheelie state which is a state preceding the wheelie state; and a controller that controls the vehicle based on an operation input. If the first determiner determines that the first condition is satisfied, the controller executes first control that reduces the output of a drive source of the vehicle. If the first determiner determines that the first condition is not satisfied and the second determiner determines that the second condition is satisfied, the controller executes second control that restricts a rate of change of the output with respect to the operation input provided to an operation member.

13 Claims, 9 Drawing Sheets

(56) References Cited

U.S. PATENT DOCUMENTS

| | | |
|---|---|---|
| 2016/0009275 A1 | 1/2016 | Hieda et al. |
| 2016/0144854 A1* | 5/2016 | Watanabe ............... B60T 8/175 477/185 |
| 2016/0160763 A1 | 6/2016 | Matsuda |
| 2017/0101945 A1 | 4/2017 | Hirokami et al. |
| 2018/0072286 A1 | 3/2018 | Hirokami et al. |
| 2018/0178768 A1 | 6/2018 | Ono et al. |
| 2018/0265092 A1 | 9/2018 | Yoneda et al. |
| 2020/0298931 A1* | 9/2020 | Okoshi ................. B60T 8/3225 |
| 2021/0191413 A1* | 6/2021 | O'Donnell ............ B60W 40/06 |
| 2022/0194352 A1* | 6/2022 | Kaneko ................. B60W 10/22 |

FOREIGN PATENT DOCUMENTS

| | | |
|---|---|---|
| JP | 2012-145072 A | 8/2012 |
| JP | 2013209047 A | 10/2013 |
| JP | 201772073 A | 4/2014 |
| JP | 2016016726 A | 2/2016 |
| JP | 2016109079 A | 6/2016 |
| JP | 2017178285 A | 10/2017 |
| JP | 2018-43627 A | 3/2018 |
| JP | 2018154242 A | 10/2018 |
| JP | 2018206401 A | 12/2018 |
| WO | 2014167983 A1 | 10/2014 |
| WO | 2017037549 A1 | 3/2017 |

* cited by examiner

WHEELIE SUPPRESSING CONTROL UNIT

CROSS-REFERENCE TO RELATED APPLICATION

This application claims priority to and the benefit of Japanese Patent Application No. 2019-160914, filed on Sep. 4, 2019, the entire disclosure of which is incorporated herein by reference.

BACKGROUND OF THE INVENTION

Field of the Invention

The present disclosure relates to a wheelie suppressing control unit.

Description of the Related Art

A control unit is known which determines whether a vehicle (wheeled vehicle) is in a wheelie state and which, upon determining that the vehicle is in the wheelie state, executes control (output reducing control) for reducing the output of a drive source in order to resolve the wheelie state. If there is a delay in determining that the vehicle has begun to enter the wheelie state, resolving of the wheelie state is delayed. However, relaxing the conditions for determining that the vehicle is in the wheelie state will increase the likelihood that the vehicle is erroneously determined to be in the wheelie state when a wheelie has not occurred in fact.

In view of the above circumstances, Japanese Laid-Open Patent Application Publication No. 2018-43627 teaches determining whether a vehicle is in a wheelie state based on a traveling state value representing the traveling state of the vehicle and an operational value representing the driving operation of the operator of the vehicle. According to this teaching, erroneous determination can be prevented, and a determination that a wheelie has begun can be quickly made.

Japanese Laid-Open Patent Application Publication No. 2012-145072 teaches detecting a stroke amount of a front fork, using the detected stroke amount to predict a stroke amount to be reached after a predetermined time, and executing control for reducing the output of an engine based on the predicted stroke amount. That is, Japanese Laid-Open Patent Application Publication No. 2012-145072 proposes starting output reducing control for resolving the wheelie state when the vehicle is still in a state preceding the entry into the wheelie state and thereby preventing a response lag of the output reducing control.

SUMMARY OF THE INVENTION

In the above conventional techniques, the output reducing control is executed when the vehicle is determined to be in the wheelie state or a state preceding the entry into the wheelie state. In particular, Japanese Laid-Open Patent Application Publication No. 2018-43627 is directed to early detection of the onset of entry into the wheelie state, and leaves room for improvement in terms of forestalling the wheelie state.

According to Japanese Laid-Open Patent Application Publication No. 2012-145072, whether the vehicle is in a state preceding the entry into the wheelie state is determined. In Japanese Laid-Open Patent Application Publication No. 2012-145072, there is an assumption that the vehicle enters the wheelie state after being determined to be in the preceding state, and the output reducing control is executed upon detection of the preceding state. In that respect, Japanese Laid-Open Patent Application Publication No. 2012-145072 is not distinct from Japanese Laid-Open Patent Application Publication No. 2018-43627. That is, the technique of Japanese Laid-Open Patent Application Publication No. 2012-145072 cannot forestall the wheelie state either. Further, in Japanese Laid-Open Patent Application Publication No. 2012-145072, the output reducing control may be executed even when the vehicle does not enter the wheelie state. Such untimely execution of the output reducing control may cause the vehicle to exhibit behaviors unexpected by the operator.

It is therefore an object of the present disclosure to provide a wheelie suppressing control unit configured to forestall the occurrence of a wheelie state of a vehicle.

A wheelie suppressing control unit according to one aspect of the present disclosure includes: a first determiner that determines whether a vehicle including a drive source and an operation member operable to change an output of the drive source is in a traveling state satisfying a first condition representing a wheelie state; a second determiner that determines whether the vehicle is in a traveling state satisfying a second condition representing a pre-wheelie state which is a state preceding the wheelie state; and a controller that controls the vehicle based on an operation input provided to the operation member, wherein if the first determiner determines that the first condition is satisfied, the controller executes first control that reduces the output of the drive source of the vehicle, and if the first determiner determines that the first condition is not satisfied and the second determiner determines that the second condition is satisfied, the controller executes second control that restricts a rate of change of the output with respect to the operation input provided to the operation member.

In the above configuration, it is determined whether the traveling state of the vehicle is the pre-wheelie state preceding the wheelie state and, if the vehicle is determined to be in the pre-wheelie state, the second control different from the first control which is output reducing control is executed. The second control restricts the rate of change of the output with respect to the operation input provided by the operator to the operation member. Thus, during the second control, the output of the drive source is changed gently (or smoothly) even if the operator performs an operation which would otherwise induce an abrupt output change (torque change). As such, when the vehicle is in the state preceding the wheelie state, an abrupt change in the output of the drive source can be prevented, and thus the occurrence of the wheelie state can be forestalled.

Even in the case where entry into the wheelie state is relatively acceptable due to the specifications of the vehicle or the preference of the operator, sudden entry into the wheelie state (abrupt change in wheelie angle) is unfavorable. Hence, also for the vehicle designed such that entry into the wheelie state is relatively acceptable, the above configuration is useful in order to forestall sudden entry into the wheelie state.

The vehicle may include an electronic throttle device that changes an opening degree of a throttle valve of the drive source based on an opening degree command value signal provided from the controller, the controller may include a signal generator that generates the opening degree command value signal provided to the electronic throttle device based on an operation amount of the operation member, and in the second control, the signal generator may generate the opening degree command value signal such that a change rate of the opening degree of the throttle valve is restricted to be equal to or lower than a predetermined upper limit.

In the above configuration, the second control restricts the change rate of the opening degree of the throttle valve. Thus, control for preventing an abrupt change in the output of the drive source can be easily accomplished.

The vehicle may include an electronic throttle device that changes an opening degree of a throttle valve of the drive source based on an opening degree command value signal provided from the controller, the controller may include a signal generator that generates the opening degree command value signal provided to the electronic throttle device based on an operation amount of the operation member, and in the second control, the signal generator may generate the opening degree command value signal such that an acceleration of the vehicle in a traveling direction is adjusted to a predetermined target acceleration.

In the above configuration, the second control restricts the opening degree of the throttle valve such that the acceleration of the vehicle in the traveling direction is adjusted to a predetermined target acceleration. That is, the acceleration of the vehicle in the traveling direction is controlled to the predetermined target acceleration even if the operator performs an operation which would otherwise causes the acceleration of the vehicle in the traveling direction to exceed the target acceleration. Thus, control for preventing an abrupt change in the output of the drive source can be easily accomplished.

The first condition may include a condition that an acceleration of the vehicle in a traveling direction is equal to or higher than a first threshold, and the second condition may include a condition that the acceleration of the vehicle in the traveling direction is equal to or higher than a second threshold lower than the first threshold.

In the above configuration, the criterion (condition) for determining whether the vehicle is in the wheelie state or pre-wheelie state based on the acceleration of the vehicle in the traveling direction can be easily set.

The vehicle may be a straddle vehicle having a vehicle body tiltable in a direction crossing the traveling direction, and the first determiner may acquire a tilt angle of the vehicle body and set the first threshold as a function of the tilt angle such that the greater the tilt angle is, the higher the first threshold is.

The greater the tilt angle is (namely, the more the vehicle body is tilted), the less likely the vehicle is to enter the wheelie state. Thus, in the above configuration where the greater the tilt angle is, the lower is the likelihood that the vehicle is determined to be in the wheelie state, switching of the type of control can be performed appropriately.

The vehicle may be a straddle vehicle having a vehicle body tiltable in a direction crossing the traveling direction, and the second determiner may acquire a tilt angle of the vehicle body and set the second threshold as a function of the tilt angle such that the greater the tilt angle is, the higher the second threshold is.

The greater the tilt angle is (namely, the more the vehicle body is tilted), the less likely the vehicle is to enter the wheelie state. Thus, in the above configuration where the greater the tilt angle is, the lower is the likelihood that the vehicle is determined to be in the pre-wheelie state, switching of the type of control can be performed appropriately.

The first condition may include a condition that a contraction amount of a front suspension of the vehicle is equal to or smaller than a third threshold, and the second condition may include a condition that the contraction amount of the front suspension of the vehicle is equal to or smaller than a fourth threshold greater than the third threshold.

In the above configuration, the criterion (condition) for determining whether the vehicle is in the wheelie state or pre-wheelie state based on the contraction amount of the front suspension can be easily set.

The vehicle may include a rear wheel as a drive wheel and a front wheel as a driven wheel, and the first condition may include a condition that a difference of an acceleration of the front wheel from an acceleration of the vehicle in a traveling direction is equal to or greater than a fifth threshold.

In the above configuration, the criterion (condition) for determining whether the vehicle is in the wheelie state based on the difference of the acceleration of the front wheel from the acceleration in the traveling direction can be easily set.

The vehicle may include a transmission shiftable among a plurality of gear positions, and the first condition or the second condition may include a condition that the transmission is in a predetermined gear position where a gear ratio is equal to or higher than a predetermined value or in a gear position lower than the predetermined gear position.

In the above configuration, the first or second control can be executed in a gear ratio range where the wheelie state is likely to occur. As such, erroneous determination can be prevented.

The first determiner or the second determiner may acquire ground surface information about a ground surface on which the vehicle is traveling, and determine whether the ground surface is a specified ground surface based on the acquired ground surface information, and the first condition or the second condition may include a condition that the vehicle is traveling on the specified ground surface.

In the above configuration, the first or second control can be executed when the vehicle is traveling on a specified ground surface on which the wheelie state is likely to occur. As such, erroneous determination can be prevented.

The vehicle may be a straddle vehicle having a vehicle body tiltable in a direction crossing the traveling direction, and the controller may acquire a tilt angle of the vehicle body and execute the first control such that the greater the tilt angle of the vehicle body is, the smaller is a degree of the reduction in the output of the drive source.

The greater the tilt angle is (namely, the more the vehicle body is tilted), the less likely the vehicle is to enter the wheelie state and the more easily the vehicle can be restored from the wheelie state. As such, suitable control can be accomplished by controlling the drive source such that the greater the tilt angle is, the smaller the degree of the output reduction is.

The vehicle may be a straddle vehicle having a vehicle body tiltable in a direction crossing the traveling direction, and the controller may acquire a tilt angle of the vehicle body and execute the second control such that the greater the tilt angle of the vehicle body is, the smaller is a degree of the restriction in the second control.

The greater the tilt angle is (namely, the more the vehicle body is tilted), the less likely the vehicle is to enter the wheelie state and the more easily the vehicle can be restored from the wheelie state. As such, suitable control can be accomplished by controlling the drive source such that the greater the tilt angle is, the smaller is the degree of the restriction in the second control.

According to the present disclosure, the occurrence of a wheelie state of a vehicle can be forestalled.

DETAILED DESCRIPTION OF THE EMBODIMENTS

Hereinafter, embodiments will be described with reference to the drawings. The same or like elements are denoted by the same reference signs throughout the drawings and will not be described repeatedly.

Figure 1:
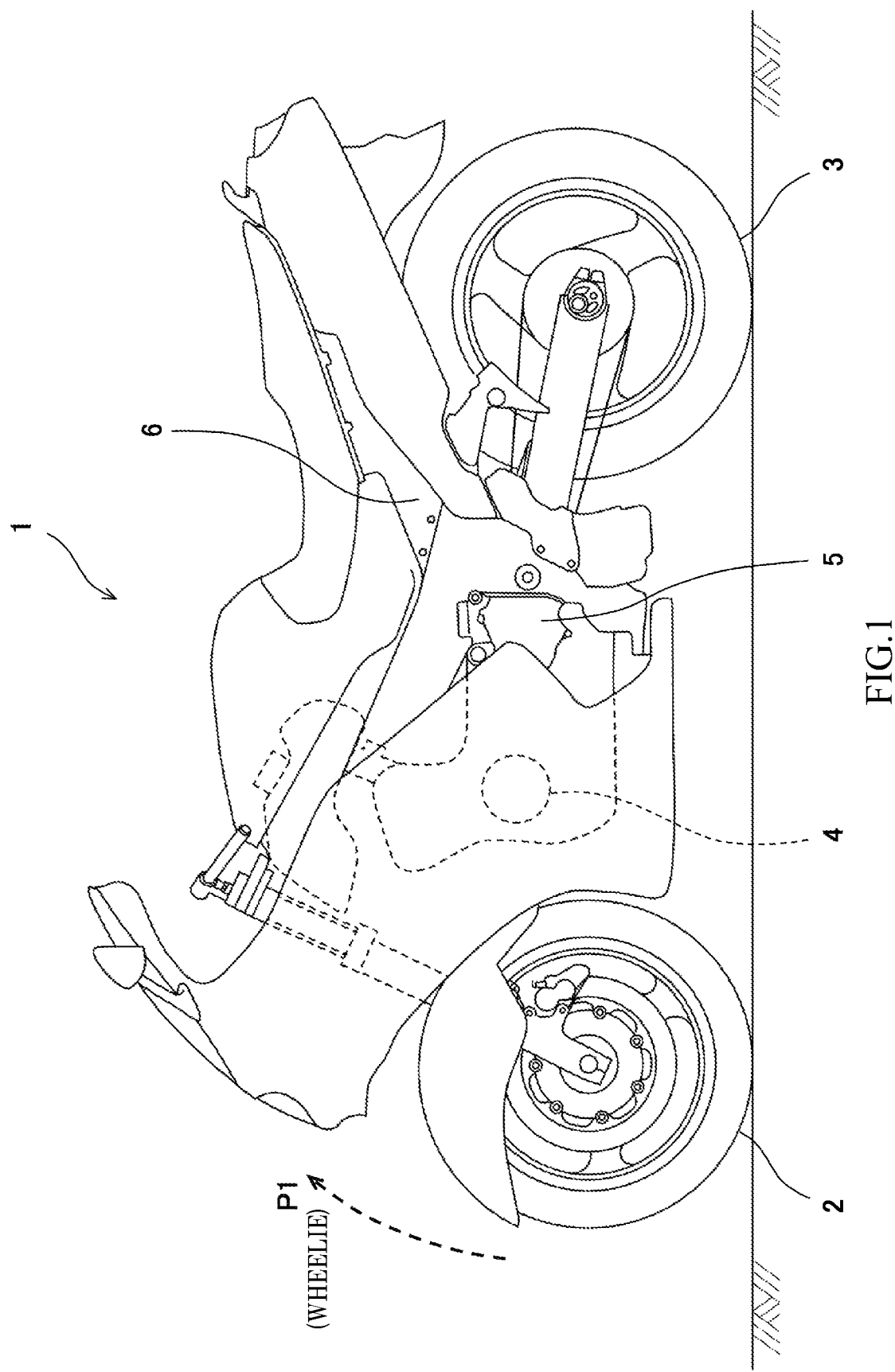
FIG. 1 is a left side view of a motorcycle presented as an exemplary vehicle.
Figure 2:
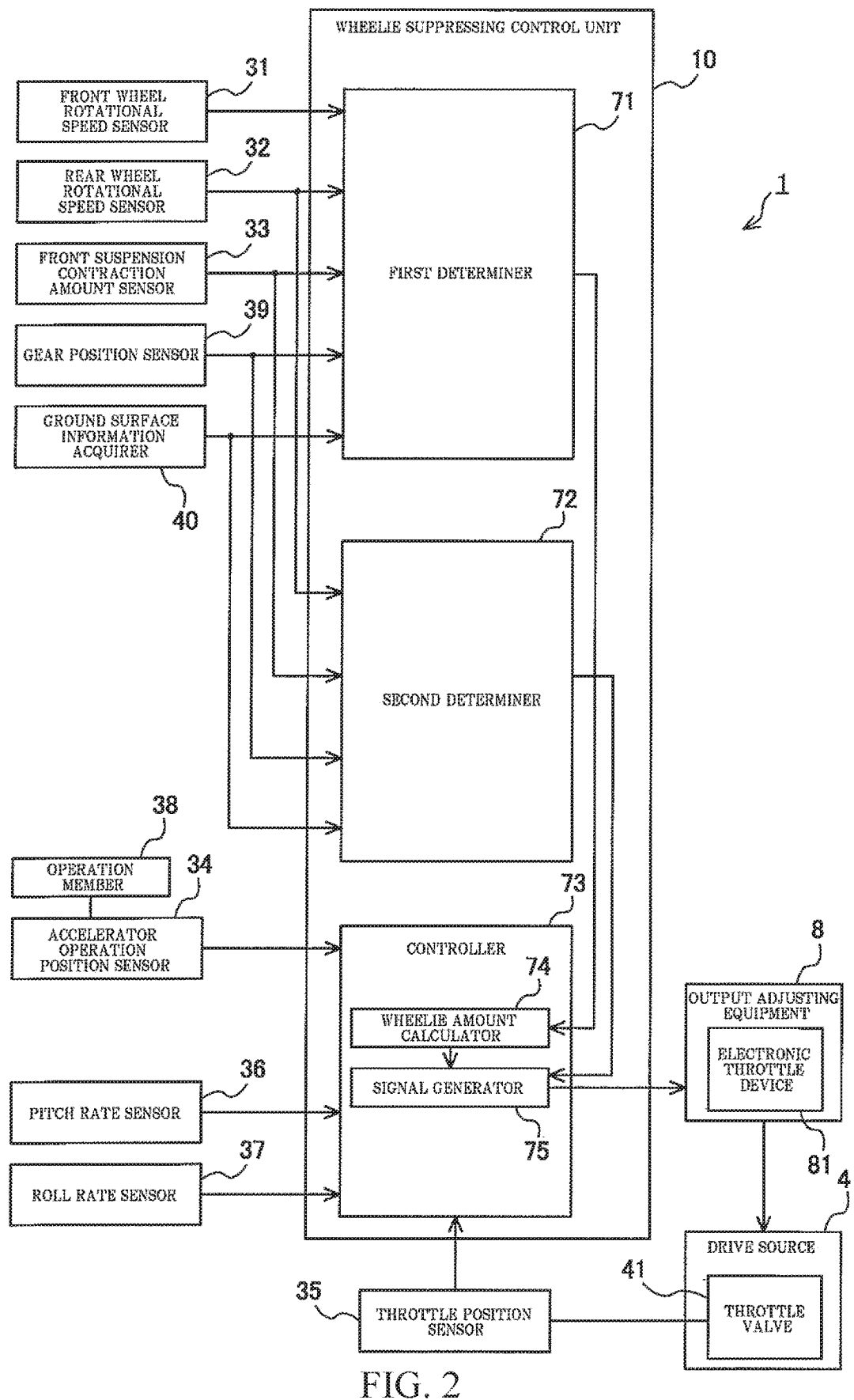
FIG. 2 is a block diagram illustrating a control system of a vehicle including a wheelie suppressing control unit according to one embodiment.

FIG. 1 is a left side view of a motorcycle presented as an exemplary vehicle. The vehicle 1 of FIG. 1 includes a front wheel 2, a rear wheel 3, and a drive source 4, and the rear wheel 3 is driven by power generated by the drive source 4. That is, the rear wheel 3 is a drive wheel, and the front wheel 2 is a driven wheel. The drive source 4 may be an engine, an electric motor, or a combination thereof. The following describes an example in which an engine is incorporated as the drive source 4. The vehicle 1 includes output adjusting equipment 8 that adjusts the output of the drive source 4. When the drive source 4 is embodied by an engine, the output adjusting equipment 8 includes a throttle valve, an injector, and an ignition plug. The power generated by the drive source 4 is transmitted to the rear wheel 3 through a power transmission mechanism such as a transmission 5. The vehicle 1 includes a wheelie suppressing control unit 10 (FIG. 2 referred to below).

The motorcycle illustrated as an example of the vehicle 1 includes one front wheel 2 and one rear wheel 3. In this motorcycle, the wheelbase is small and the output-to-weight ratio [W/kg] is relatively large. As such, the motorcycle is likely to undergo a wheelie which is a phenomenon where the front wheel 2 comes off the ground surface. Hence, the motorcycle, which is a straddle vehicle, is a suitable example of the vehicle 1 including the wheelie suppressing control unit 10.

During the process where the front wheel 2 is being raised off the ground surface (process where the wheelie amount increases), the vehicle body 6 angularly moves in a rotational direction P1 in which the front wheel 2 comes off the ground surface (e.g., a clockwise direction in the left side view) about an imaginary angular movement axis passing through the ground contact point of the rear wheel in the vehicle width direction. The "wheelie amount" is a quantity representing the degree to which the front wheel 2 is raised off the ground surface. In the following description, the angular movement of the vehicle body 6 about the first imaginary angular movement axis extending in the vehicle width direction is referred to as "pitch", and the rotational angle of the vehicle body 6 about the first angular movement axis is referred to as "pitch angle".

The angular movement of the vehicle body 6 about a second imaginary angular movement axis extending in the vehicle length direction is referred to as "role", and the rotational angle of the vehicle body 6 about the second angular movement axis is referred to as "roll angle" (or "bank angle"). When a straddle vehicle such as a motorcycle is maneuvered to change the traveling direction (make a turn), the vehicle body 6 is tilted in a direction crossing the current traveling direction (in particular, tilted inward with respect to the turning direction), so that the roll angle changes significantly.

FIG. 2 is a block diagram showing a control system of the vehicle including the wheelie suppressing control unit according to one embodiment. As shown in FIG. 2, the wheelie suppressing control unit 10 is embodied by an electronic control unit that controls the vehicle 1. Alternatively, the wheelie suppressing control unit 10 may be embodied by another control unit (sub-ECU) different from the electronic control unit. Various sensors described later are connected to the wheelie suppressing control unit 10, and the wheelie suppressing control unit 10 acquires detection values of the various sensors. The wheelie suppressing control unit 10 includes a processor, a volatile memory, a non-volatile memory (storage medium), and an I/O interface. The processor executes processing procedures using the volatile memory according to programs stored in the non-volatile memory, thus accomplishing various types of control.

The vehicle 1 includes an operation member 38 operable to change the output of the drive source 4. The operation member 38 is equipped with an accelerator operation position sensor 34. The accelerator operation position sensor 34 detects the operation position (operation amount) of the operation member 38.

The wheelie suppressing control unit 10 includes a controller (output controller) 73 as a functional block that controls the output of the drive source 4. When the operator operates the operation member (such as when the operator rotates the accelerator grip in the throttle opening direction or presses the accelerator pedal by his/her foot in the throttle opening direction), the accelerator operation position sensor 34 detects the operation position of the operation member 38 and transmits an accelerating operation amount to the wheelie suppressing control unit 10. The wheelie suppressing control unit 10 acquires the accelerating operation amount and outputs a control signal generated based on the accelerating operation amount to the output adjusting equipment 8 which adjusts the output of the drive source 4. The control signal is corrected according to detection values of various other sensors described later.

In the present embodiment, the output adjusting equipment 8 includes an electronic throttle device 81. In this case, an opening degree command value signal is transmitted as the control signal from the controller 73 to the electronic throttle device 81. The electronic throttle device 81 changes the opening degree of a throttle valve 41 of the drive source 4 based on the opening degree command value signal. The opening degree of the throttle valve 41 is detected by a throttle position sensor 35 and input to the electronic control unit. Thus, the controller 73 can perform feedback control of the opening degree of the throttle valve.

The various sensors which provide their respective detection values to the wheelie suppressing control unit 10 include the accelerator operation position sensor 34 and the throttle position sensor 35 which are mentioned above, and further include a front wheel rotational speed sensor 31, a rear wheel rotational speed sensor 32, a front suspension contraction amount sensor 33, a pitch rate sensor 36, a roll rate sensor 37, and a gear position sensor 39.

The front wheel rotational speed sensor 31 is mounted on the front wheel 2, and detects the rotational speed (peripheral speed) of the front wheel 2. The wheelie suppressing control unit 10 derives the peripheral speed of the front wheel 2 (hereinafter referred to as "front wheel speed") and the peripheral acceleration of the front wheel 2 (hereinafter referred to as "front wheel acceleration") from detection values of the front wheel rotational speed sensor 31. The rear wheel rotational speed sensor 32 is mounted on the rear wheel 3 and detects the rotational speed (peripheral speed) of the rear wheel 3. The wheelie suppressing control unit 10 derives the peripheral speed of the rear wheel 3 (hereinafter referred to as "rear wheel speed") and the peripheral acceleration of the rear wheel 3 (hereinafter referred to as "rear wheel acceleration") from detection values of the rear wheel rotational speed sensor 32. Each of the peripheral accelerations can be easily derived from the current value and a past value of the peripheral speed (the past value is, for example, a value acquired in the immediately previous sampling period).

The rear wheel acceleration derived from detection values of the rear wheel rotational speed sensor 32 is the acceleration of the vehicle 1 relative to the ground (the acceleration of the vehicle 1 in the traveling direction). The wheelie suppressing control unit 10 further derives the difference between the rear wheel acceleration and the front wheel acceleration. The derived difference in acceleration is the difference of the acceleration of the front wheel 2 from the acceleration of the vehicle 1 in the traveling direction. The front suspension contraction amount sensor 33 detects the contraction amount (stroke amount) of a front suspension mechanism mounted on a front fork supporting the front wheel 2. The contraction amount detected by the front suspension contraction amount sensor 33 is zero at the moment when the front suspension mechanism is fully extended, then increases as the front suspension mechanism is being contracted, and reaches a maximum at the moment when the front suspension mechanism is fully contracted.

Both the pitch rate sensor 36 and the roll rate sensor 37 are rate gyro sensors and disposed, for example, in the vicinity of the center of gravity of the vehicle 1. The wheelie suppressing control unit 10 acquires detection values from the pitch rate sensor 36 and the roll rate sensor 37 at sequential time points during a predetermined sampling period and integrates the acquired detection values to determine the amounts of change in pitch angle and roll angle from predetermined initial values.

The gear position sensor 39 is a sensor that detects the gear position of the transmission 5. The transmission 5 is shiftable among a plurality of gear positions differing in gear ratio which is the rotational speed ratio of the input shaft to the output shaft. The lower the gear position is, the higher the gear ratio is.

The wheelie suppressing control unit 10 includes, in addition to the controller 73, a first determiner 71 and a second determiner 72 as functional blocks.

Figure 3:
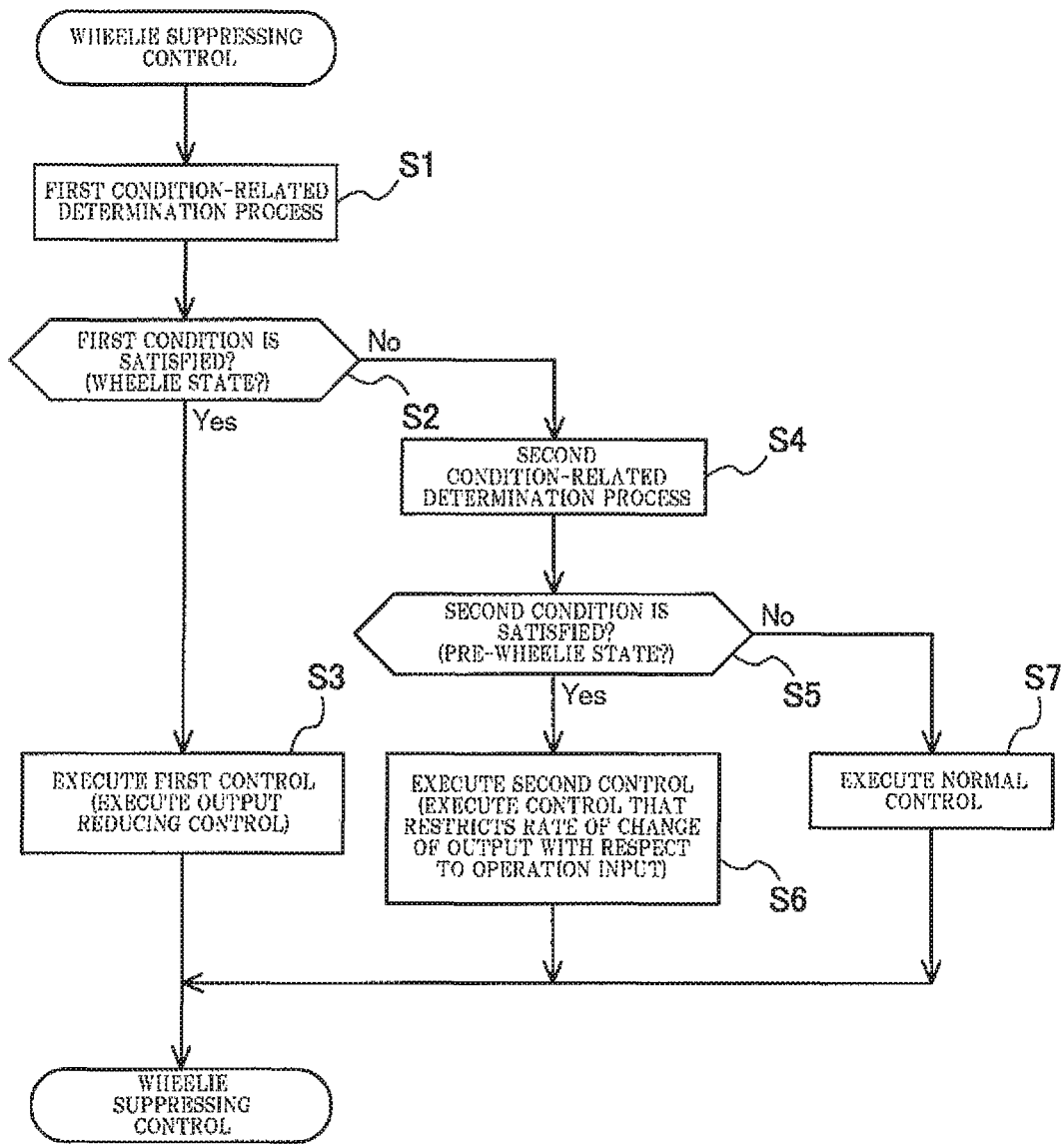
FIG. 3 is a flowchart illustrating wheelie suppressing control in the embodiment.

FIG. 3 is a flowchart illustrating wheelie suppressing control in the present embodiment. First, the first determiner 71 performs a first condition-related determination process in which the first determiner 71 determines whether the vehicle 1 is in a traveling state satisfying a first condition representing a wheelie state (step S1). The controller 73 acquires the result of the first condition-related determination process performed by the first determiner 71. If the vehicle 1 is determined to be in a traveling state satisfying the first condition representing the wheelie state (Yes in step S2), the controller 73 executes first control that reduces the output of the drive source 4 of the vehicle 1 (step S3).

First Condition-Related Determination Process

At the moment when the front wheel 2 begins to be raised off the ground surface, it is highly probable that the output of the drive source 4 is high, that high power is transmitted from the drive source 4 to the rear wheel 3 serving as the drive wheel, and therefore that the speed and acceleration relative to the ground are high. After the front wheel 2 comes off the ground surface, the front wheel 2 rotates by inertia while being subjected to air resistance and friction with the axle. Thus, the front wheel speed gradually decreases. In view of this situation, the first condition for determining whether the vehicle is in the wheelie state is set.

Figure 4:
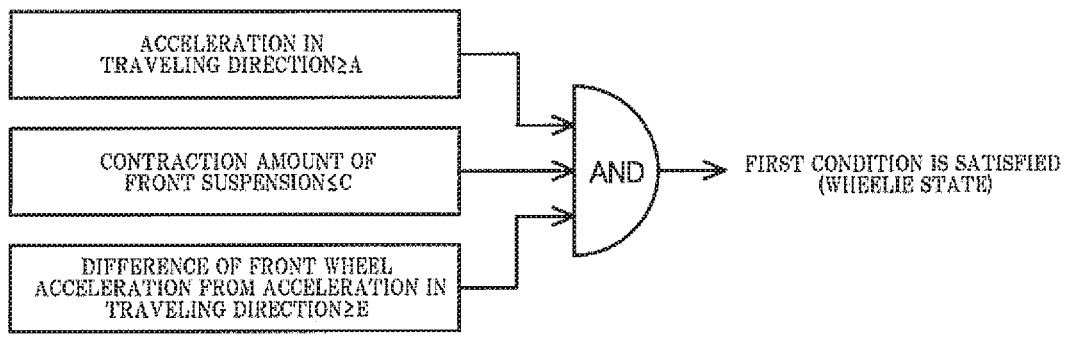
FIG. 4 illustrates a first condition in the embodiment.

FIG. 4 illustrates the first condition in the present embodiment. The first condition includes a condition that the acceleration of the vehicle 1 in the traveling direction is equal to or higher than a first threshold A. The first determiner 71 calculates the rear wheel acceleration from detection values of the rear wheel rotational speed sensor 32 and handles the calculated rear wheel acceleration as the acceleration of the vehicle 1 in the traveling direction. The first determiner 71 determines whether the acceleration of the vehicle 1 in the traveling direction is equal to or higher than the first threshold A (first determination as to the first condition). The first determination is based on the fact that the higher is the acceleration of the vehicle 1 in the traveling direction, the more likely the vehicle 1 is to enter the wheelie state.

The first determiner 71 derives the tilt angle (roll angle) of the vehicle body 6 from detection values of the roll rate sensor 37, and sets the first threshold A as a function of the tilt angle of the vehicle body 6 such that the greater the tilt angle is, the higher the first threshold A is. For the vehicle 1 whose vehicle body 6 is tilted during a turn, it can be said that the greater the tilt angle of the vehicle body 6 is (namely, the more the vehicle body 6 is tilted), the less likely the vehicle 1 is to enter the wheelie state. For this reason, the first threshold A is set such that the greater the tilt angle is, the lower is the likelihood that the vehicle 1 is determined to be in the wheelie state.

The first condition further includes a condition that the contraction amount of the front suspension of the vehicle 1 is equal to or smaller than a third threshold C. The first determiner 71 acquires a detection value of the front suspension contraction amount sensor 33 and determines whether the detection value is equal to or smaller than the third threshold C (second determination as to the first condition). The second determination is based on the fact that as more of the load on the wheels of the vehicle 1 is disproportionately applied to the rear wheel 3 (as more of the vehicle weight is placed on the rear wheel), the vehicle 1 becomes more likely to enter the wheelie state.

The first condition further includes a condition that the difference of the acceleration of the front wheel 2 from the acceleration of the vehicle 1 in the traveling direction is equal to or greater than a fifth threshold E. The first determiner 71 calculates the rear wheel acceleration from detection values of the rear wheel rotational speed sensor 32 and the front wheel acceleration from detection values of the front wheel rotational speed sensor 31, and derives the difference between the rear wheel acceleration and the front wheel acceleration. The first determiner 71 handles the derived difference in acceleration as the difference of the acceleration of the front wheel 2 from the acceleration of the vehicle 1 in the traveling direction, and determines whether the difference in acceleration is equal to or greater than the fifth threshold E (third determination as to the first condition). The third determination is based on the fact that once the vehicle enters the wheelie state, the front wheel speed decreases relative to the rear wheel speed because the front wheel 2 is raised off the ground surface. In the case where such a determination is made, the criterion (condition) for determining whether the vehicle is in the wheelie state based on the difference of the front wheel acceleration from the acceleration in the traveling direction can be easily set.

In the present embodiment, when all of the first to third determinations as to the first condition are positive, the first determiner 71 determines that the first condition is satisfied. In response to this result, the controller 73 executes the first control that reduces the output of the drive source 4 of the vehicle 1.

First Control

The controller 73 includes a wheelie amount calculator 74 and a signal generator 75 as control blocks for executing the first control. In deriving the wheelie amount, the wheelie amount calculator 74 calculates the amount of change in angular position of the vehicle body 6 in the rotational direction P1 in which the front wheel 2 comes off the ground surface (clockwise direction in the left side view) from the start of the first control.

The wheelie amount calculator 74 assigns a predetermined reference value to the angular position assumed by the vehicle body 6 at the start of the first control. The wheelie amount calculator 74 adds the amount of change in angular position to the reference value and handles the resulting sum as the wheelie amount. The reference value is, for example, a zero value, and in this case the amount of change in angular position from the start of the first control corresponds to the wheelie amount. The wheelie amount calculator 74 acquires detection values of the pitch rate sensor 36 at sequential time points during a predetermined sampling period and integrates the acquired detection values to determine the amount of change in angular position.

To calculate the wheelie amount, detection values of a sensor other than the pitch rate sensor 36 may be used. For example, detection values of an inertial sensor other than the rate gyro sensor, detections values of an integrating gyro sensor that detects the pitch angle, or detection values of an angular accelerometer that detects the pitch angular acceleration may be used. Alternatively, detection values of a sensor that detects the stroke of the rear suspension may be used.

In the first control, the signal generator 75 generates an output reducing signal for reducing the output of the drive source 4 based on the wheelie amount calculated by the wheelie amount calculator 74 and on the rotational speed of the drive source 4 (engine speed) as detected when the wheelie amount was calculated. No particular limitation is imposed on how to reduce the output. For example, the signal generator 75 generates the output reducing signal as a function of the calculated wheelie amount such that the opening degree of the throttle valve, the amount of fuel to be injected, the number of cylinders into which the fuel is injected, and/or the number of cylinders for which the ignition plug operates is decreased and/or that the ignition timing is retarded.

In the present embodiment, the output adjusting equipment 8 includes an electronic throttle device that changes the opening degree of the throttle valve of the drive source 4. When the output reducing signal generated by the signal generator 75 is a control signal related to the opening degree of the throttle valve, the output reducing signal includes an opening degree command value signal directed to the throttle valve. The opening degree command value signal generated as the output reducing signal is configured such that the maximum of the opening degree command value is smaller than in normal control periods during which the first control is not executed.

The output reducing signal is generated such that the greater the wheelie amount is, the greater is the amount by which the output of the drive source 4 is reduced. When the wheelie amount is smaller than a predetermined threshold, the amount by which the output of the drive source 4 is reduced may be 0 (this means that the output reducing control is not performed substantially). The elapsed time from the start of the first control may be measured by a timer (not shown), and the output adjusting equipment 8 may be controlled such that the longer the elapsed time is, the greater is the amount by which the output of the drive source 4 is reduced.

Further, the signal generator 75 acquires the tilt angle (roll angle/bank angle) of the vehicle body 6 and generates the output reducing signal such that the greater the tilt angle of the vehicle body 6 is, the smaller is the degree of the reduction in the output of the drive source 4. More specifically, the signal generator 75 corrects the amount of the reduction in the output of the drive source 4 in such a manner that the greater the tilt angle of the vehicle body 6 is, the smaller the amount of the output reduction is.

The greater the tilt angle is (namely, the more the vehicle body 6 is tilted), the less likely the vehicle is to enter the wheelie state and the more easily the vehicle can be restored from the wheelie state. As such, suitable control can be accomplished by controlling the drive source 4 such that the greater the tilt angle is, the smaller the degree of the output reduction is.

The output reducing signal generated by the signal generator 75 is transmitted to the corresponding component of the output adjusting equipment 8, and the component is controlled based on the output reducing signal. Thus, the output of the drive source 4 is reduced.

In the first condition-related determination process, if it is determined that the vehicle 1 is not in a traveling state satisfying the first condition representing the wheelie state, that is, if at least one of the first to third determinations as to the first condition is negative (No in step S2), the second determiner 72 performs a second condition-related determination process in which the second determiner 72 determines whether the vehicle 1 is in a traveling state satisfying a second condition representing a pre-wheelie state which is a state preceding the wheelie state (step S4).

The controller 73 acquires the result of the second condition-related determination process performed by the second determiner 72. If the vehicle 1 is determined to be in a traveling state satisfying the second condition representing the pre-wheelie state (Yes in step S5), the controller 73 executes second control that restricts the rate of change of the output with respect to the operation input provided to the operation member 38 (step S6). If it is determined that the second condition is not satisfied (No in step S5), the controller 73 executes normal control (step S7). The normal control is output control in which neither the first control nor the second control is performed.

Second Condition-Related Determination Process

Figure 5:
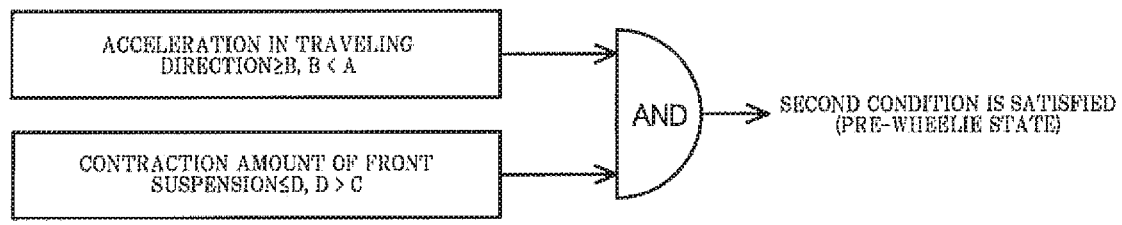
FIG. 5 illustrates a second condition in the embodiment.

FIG. 5 illustrates the second condition in the present embodiment. The second condition includes a condition that the acceleration of the vehicle 1 in the traveling direction is equal to or higher than a second threshold B lower than the first threshold A. The second determiner 72 calculates a rear wheel acceleration from detection values of the rear wheel rotational speed sensor 32 and handles the calculated rear wheel acceleration as the acceleration of the vehicle 1 in the traveling direction. The second determiner 72 determines whether the acceleration of the vehicle 1 in the traveling direction is equal to or higher than the second threshold B (first determination as to the second condition). In the case where such a determination is made, the criterion (condition) for determining whether the vehicle 1 is in the wheelie state or pre-wheelie state based on the acceleration of the vehicle 1 in the traveling direction can be easily set.

The second determiner 72 derives the tilt angle (roll angle) of the vehicle body 6 from detection values of the roll rate sensor 37, and sets the second threshold B as a function of the tilt angle of the vehicle body 6 such that the greater the tilt angle is, the higher the second threshold B is. For the vehicle 1 whose vehicle body 6 is tilted during a turn, it can be said that the greater the tilt angle of the vehicle body 6 is (namely, the more the vehicle body 6 is tilted), the less likely the vehicle 1 is to enter the wheelie state. For this reason, the second threshold B is set such that the greater the tilt angle is, the lower is the likelihood that the vehicle 1 is determined to be in the pre-wheelie state defined as a state preceding the wheelie state.

The second condition further includes a condition that the contraction amount of the front suspension of the vehicle 1 is equal to or smaller than a fourth threshold D greater than the third threshold C. The second determiner 72 acquires a detection value of the front suspension contraction amount sensor 33 and determines whether the detection value is equal to or smaller than the fourth threshold D (second determination as to the second condition). In the case where such a determination is made, the criterion (condition) for determining whether the vehicle is in the wheelie state or pre-wheelie state based on the contraction amount of the front suspension can be easily set.

The pre-wheelie state is assumed to be a state where the front wheel 2 is not raised off the ground. Thus, in the pre-wheelie state, the front wheel speed and front wheel acceleration are approximately equal to the rear wheel speed and rear wheel acceleration (the acceleration of the vehicle 1 in the traveling direction). For this reason, there is not made any determination which, like the third determination as to the first condition, concerns the difference of the acceleration of the front wheel 2 from the acceleration of the vehicle 1 in the traveling direction.

The value ranges set for the first and second determinations as to the second condition respectively overlap the value ranges set for the first and second determinations as to the first condition. This is because the first or second determination as to the first condition can be positive even if the first condition is not satisfied.

For example, if the acceleration of the vehicle 1 in the traveling direction is equal to or higher than the first threshold A (and hence higher than the second threshold B) and the contraction amount of the front suspension of the vehicle 1 is greater than the third threshold C and equal to or smaller than the fourth threshold D, the first determination as to the first condition is positive while the second determination as to the first condition is negative. In this case, the first condition is not satisfied. However, both of the first and second determinations as to the second condition are positive, so that the second condition is satisfied.

In the present embodiment, when both of the first and second determinations as to the second condition are positive, the second determiner 72 determines that the second condition is satisfied. In response to this result, the controller 73 executes the second control.

Second Control

The controller 73 includes the signal generator 75 as a control block for executing the second control. In the second control, the signal generator 75 operates to restrict the rate of change of the output with respect to the operation input provided to the operation member 38. In the present embodiment, as described above, the output adjusting equipment 8 includes the electronic throttle device 81 which changes the opening degree of the throttle valve 41 of the drive source 4.

In the second control, the signal generator 75 generates the opening degree command value signal such that the change rate of the opening degree of the throttle valve 41 is restricted to be equal to or lower than a predetermined upper limit. To this end, the signal generator 75 acquires the accelerating operation amount detected by the accelerator operation position sensor 34, and derives the change rate of the accelerating operation amount (the change in accelerating operation amount per unit time). The change rate of the accelerating operation amount can be easily derived from the current value and a past value of the accelerating operation amount (the past value is, for example, a value acquired in the immediately previous sampling period).

In the second control, the signal generator 75 may restrict the change rate of the opening degree of the throttle valve 41 only when the opening degree is changed in the opening direction (only when an accelerating operation is performed). Alternatively, the signal generator 75 may restrict the change rate of the opening degree of the throttle valve 41 not only when an accelerating operation is performed but also when the opening degree is changed in the closing direction (when a decelerating operation is performed).

Figure 6:
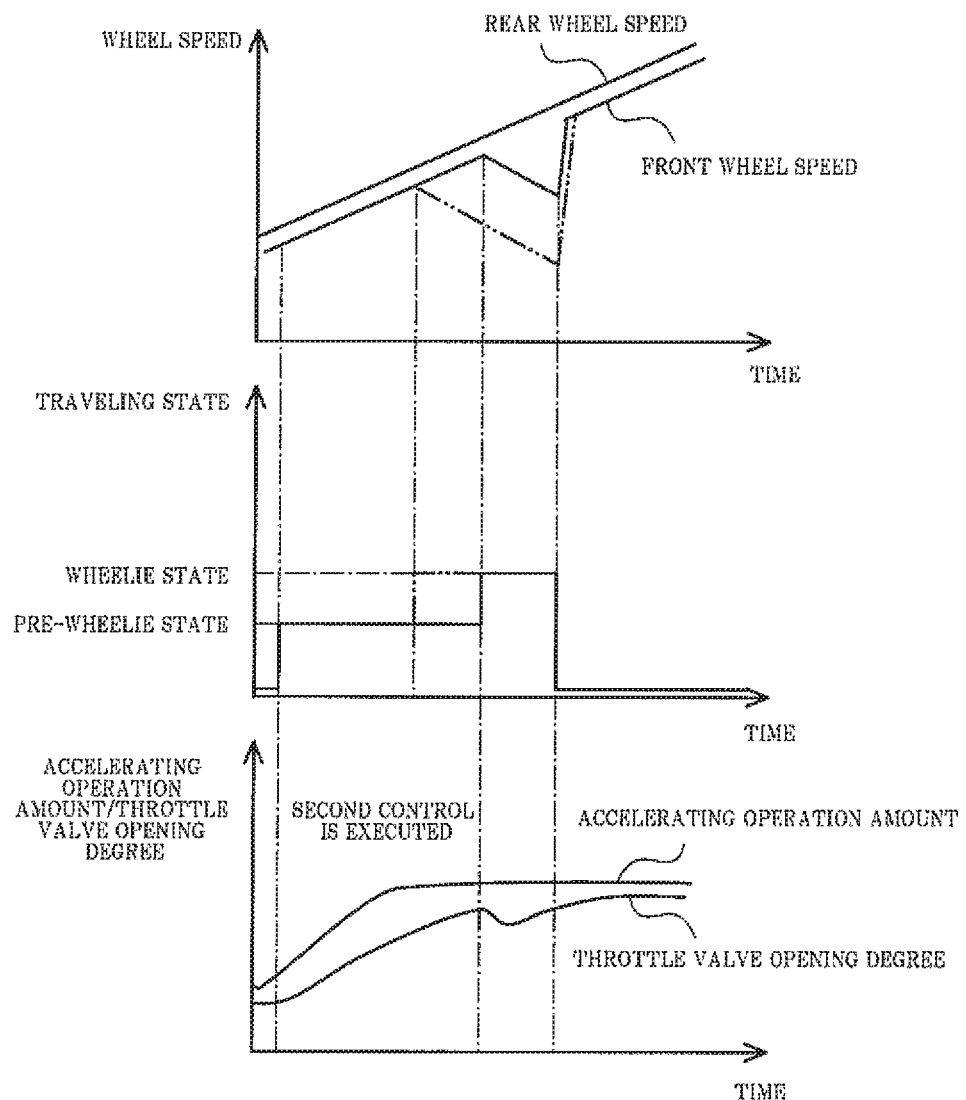
FIG. 6 depicts a graph schematically showing the change over time in the relationship of the throttle valve opening degree versus an operation input in an example of second control of the embodiment.
Figure 9:
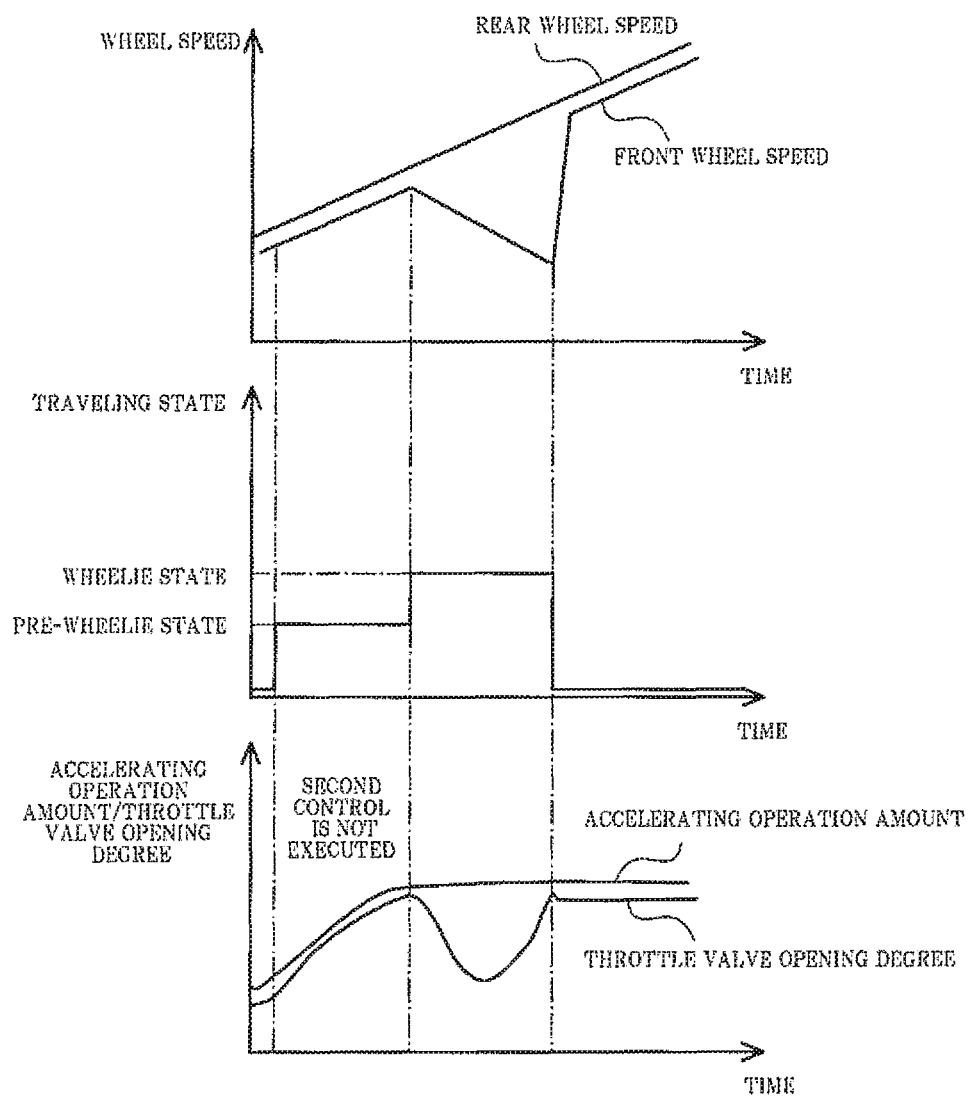
FIG. 9 depicts a graph schematically showing the change over time in the relationship of the throttle valve opening degree versus an operation input in a comparative example where the second control is not executed in the case of FIG. 6.

FIG. 6 depicts a graph schematically showing the change over time in the relationship of the throttle valve opening degree versus the operation input in an example of the second control of the present embodiment. FIG. 9 depicts a graph schematically showing the change over time in the relationship of the throttle valve opening degree versus the operation input in a comparative example where the second control is not executed in the case of FIG. 6. In both of the cases represented by the graphs of FIGS. 6 and 9, the first control (output reducing control) in the wheelie state is executed. Each of FIGS. 6 and 9 depicts the following graphs in order from top to bottom: a graph showing the change over time in wheel speed, a graph showing the change over time in vehicle state, and a graph showing the change over time in the relationship of the throttle valve opening degree versus the operation input.

In each of FIGS. 6 and 9, the period where the front wheel speed is different from (lower than) the rear wheel speed corresponds to the wheelie state, and a given period immediately prior to the period of the wheelie state corresponds to the pre-wheelie state. As shown in FIG. 9, when the second control is not executed, the opening degree command value signal is generated as a function of the operation input (accelerating operation amount), and thus the throttle valve opening degree changes with changing operation input. The control for reducing the throttle valve opening degree and therefore the output is performed only after the vehicle is determined to be in the wheelie state. As such, the wheelie amount tends to be so large that the amount of change (the amount of reduction) in throttle valve opening degree is also large.

When the second control is executed, as shown in FIG. 6, the opening degree command value signal is generated such that the change rate of the opening degree of the throttle valve 41 is restricted to be equal to or lower than a predetermined upper limit irrespective of the change rate of the accelerating operation amount. That is, even if the operator performs a rapid accelerating operation, the opening degree of the throttle valve 41 changes gently. As such, the entry into the wheelie state can be more delayed than when the second control is not executed. Further, in the event that the vehicle enters the wheelie state, the wheelie amount can be made smaller than when the second control is not executed, and the amount by which the throttle valve opening degree is reduced in the first control can be small. Thus, the change in throttle valve opening degree can be relatively gentle also in the first control.

In the configuration described above, it is determined whether the traveling state of the vehicle 1 is the pre-wheelie state preceding the wheelie state and, if the vehicle 1 is determined to be in the pre-wheelie state, the second control different from the first control which is output reducing control is executed. The second control restricts the rate of change of the output with respect to the operation input provided by the operator to the operation member 38. Thus, during the second control, the output of the drive source 4 is changed gently (or smoothly) even if the operator performs an operation which would otherwise induce an abrupt output change (torque change). As such, when the vehicle is in the state preceding the wheelie state, an abrupt change in the output of the drive source 4 can be prevented, and thus the occurrence of the wheelie state can be forestalled. Additionally, since the controller 73 (signal generator 75) generates the opening degree command value signal such that the change rate of the opening degree of the throttle valve 41 is restricted to be equal to or lower than a predetermined upper limit, the control for preventing an abrupt change in the output of the drive source 4 can be easily accomplished.

Even in the case where entry into the wheelie state is relatively acceptable due to the specifications of the vehicle 1 or the preference of the operator, sudden entry into the wheelie state (abrupt change in wheelie angle) is unfavorable. Hence, also for the vehicle 1 designed such that entry into the wheelie state is relatively acceptable, the above configuration is useful in order to prevent sudden entry into the wheelie state.

Figure 7:
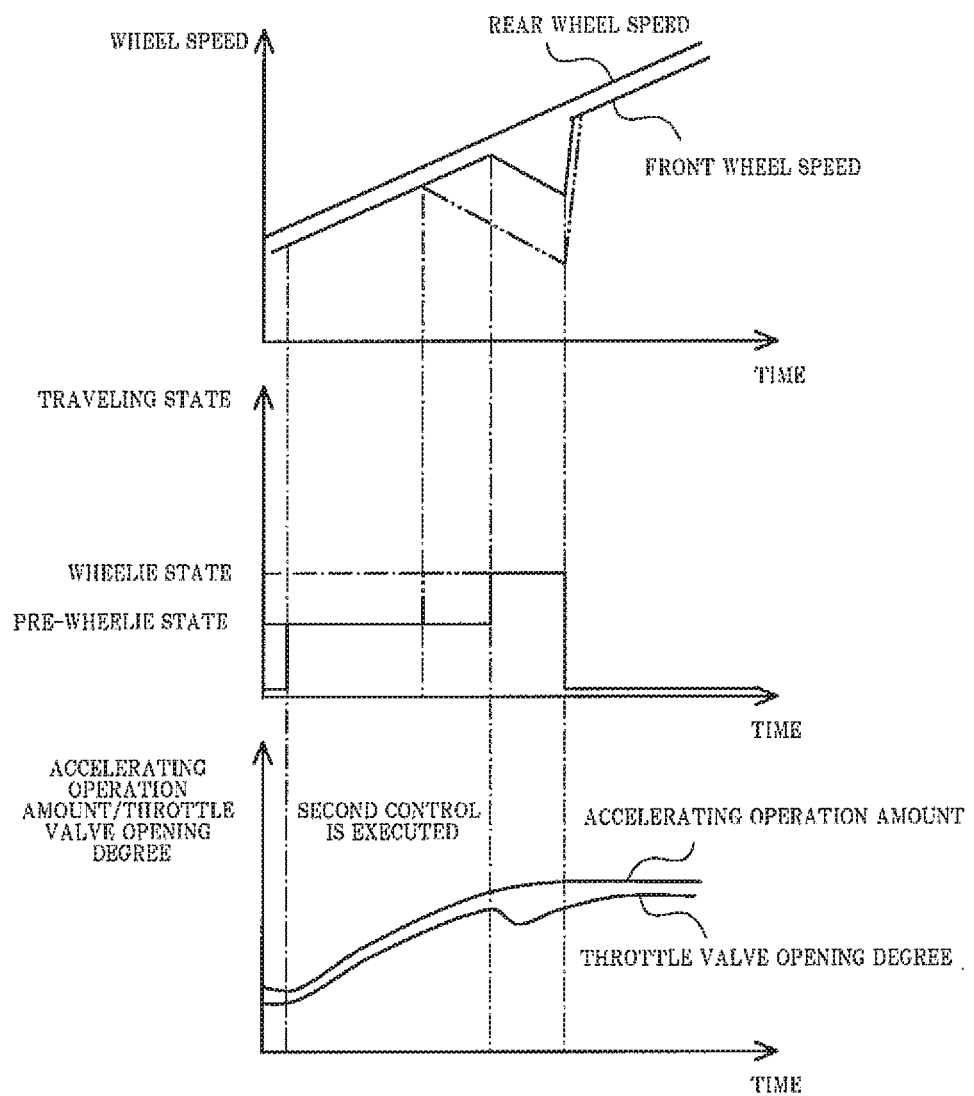
FIG. 7 depicts a graph schematically showing the change over time in the relationship of the throttle valve opening degree versus a gentle operation input in the example of the second control of the embodiment.

FIG. 7 depicts a graph schematically showing the change over time in the relationship of the throttle valve opening degree versus a gentle operation input in an example of the second control of the present embodiment. As shown in FIG. 7, when the operation input provided by the operator is gentle (when the change rate of the accelerating operation amount is lower than a predetermined reference value), the controller 73 does not restrict the change rate of the opening degree of the throttle valve 41. Thus, in the example of FIG. 7, the opening degree of the throttle valve 41 changes with changing accelerating operation amount. That is, even when the second control is being executed in the pre-wheelie state preceding the wheelie state, the controller 73 does not intervene in operations performed by the operator if the vehicle is unlikely to enter the wheelie state. As such, deteriorations in traveling state (e.g., decrease in output and decrease in responsivity to operations) due to excessive intervention by the controller 73 can be prevented.

Further, the signal generator 75 acquires the tilt angle (roll angle/bank angle) of the vehicle body 6 and generates the output reducing signal such that the greater the tilt angle of the vehicle body 6 is, the smaller is the degree of the restriction in the second control. More specifically, the signal generator 75 generates the signal such that the greater the tilt angle of the vehicle body 6 is, the higher is the upper limit of the change rate of the opening degree of the throttle valve 41.

The greater the tilt angle is (namely, the more the vehicle body 6 is tilted), the less likely the vehicle is to enter the wheelie state and the more easily the vehicle can be restored from the wheelie state. As such, suitable control can be accomplished by controlling the drive source 4 (the opening degree of the throttle valve 41) such that the greater the tilt angle is, the smaller is the degree of the restriction in the second control.

End of First Control

When a predetermined third condition is satisfied during the first control, the controller 73 ends the first control and resumes the normal control. The third condition includes a condition that the contraction amount of the front suspension of the vehicle 1 is equal to or greater than a sixth threshold F greater than the fourth threshold D (first determination as to the third condition). The third condition further includes a condition that the difference of the acceleration of the front wheel 2 from the acceleration of the vehicle 1 in the traveling direction is equal to or smaller than a seventh threshold G smaller than the fifth threshold E (second determination as to the third condition). In the present embodiment, the controller 73 ends the first control when at least one of the first and second determinations as to the third condition is positive.

End of Second Control

Likewise, when the predetermined third condition is satisfied during the second control, the controller 73 ends the second control and resumes the normal control. It should be noted that the pre-wheelie state for which the second control is executed is assumed to be a state where the front wheel 2 is not raised off the ground. Thus, the above second determination as to the third condition is not made for the end of the second control.

Variant of Second Control

The manner in which the rate of change of the output with respect to the operation input provided to the operation member 38 is restricted in the second control is not limited to the one described above. In the second control, for example, the signal generator 75 may generate the opening degree command value signal such that the acceleration of the vehicle 1 in the traveling direction is adjusted to a predetermined target acceleration.

Figure 8:
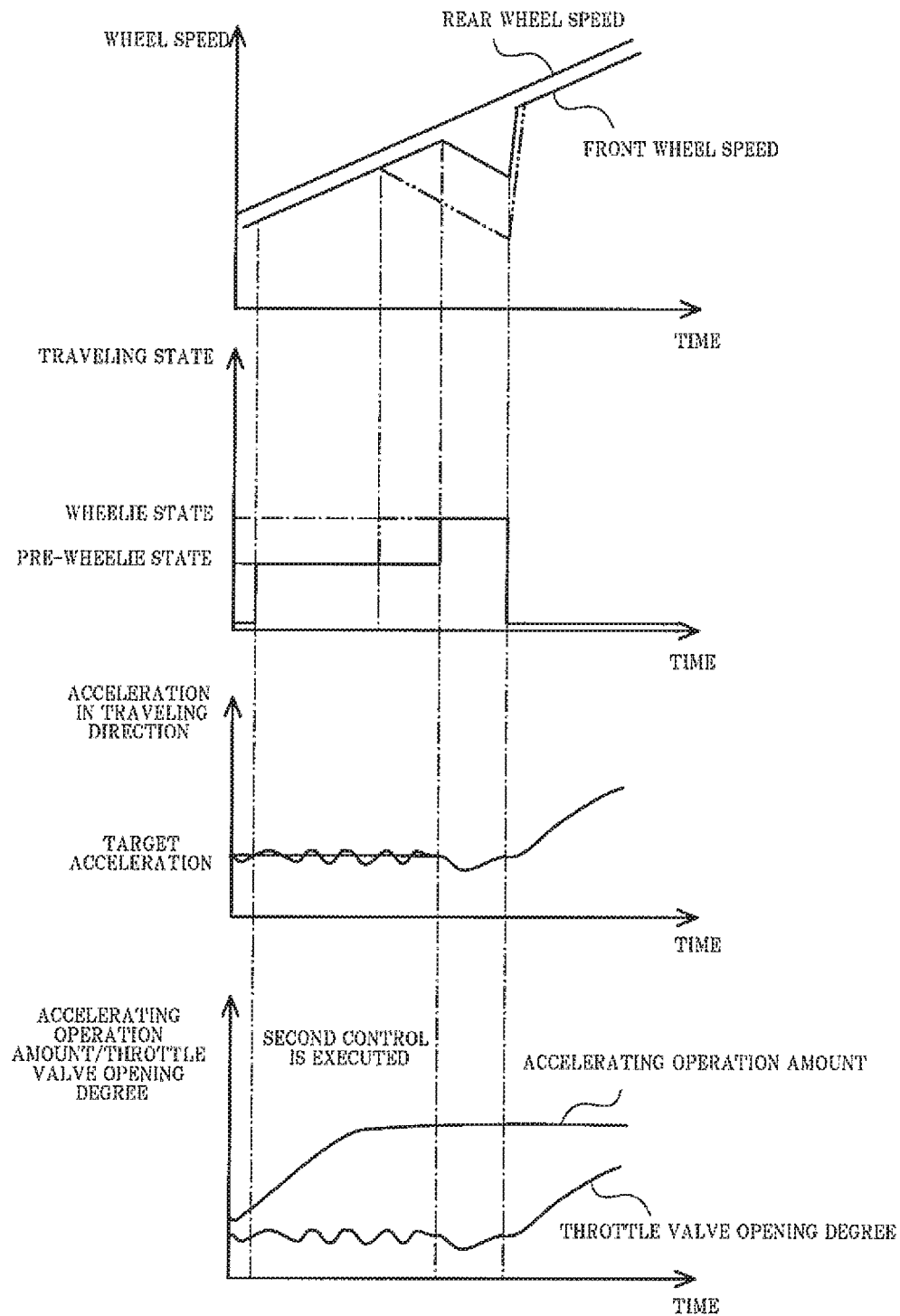
FIG. 8 depicts a graph schematically showing the change over time in the relationship of the throttle valve opening degree versus an operation input in another example of the second control of the embodiment.
Figure 10:
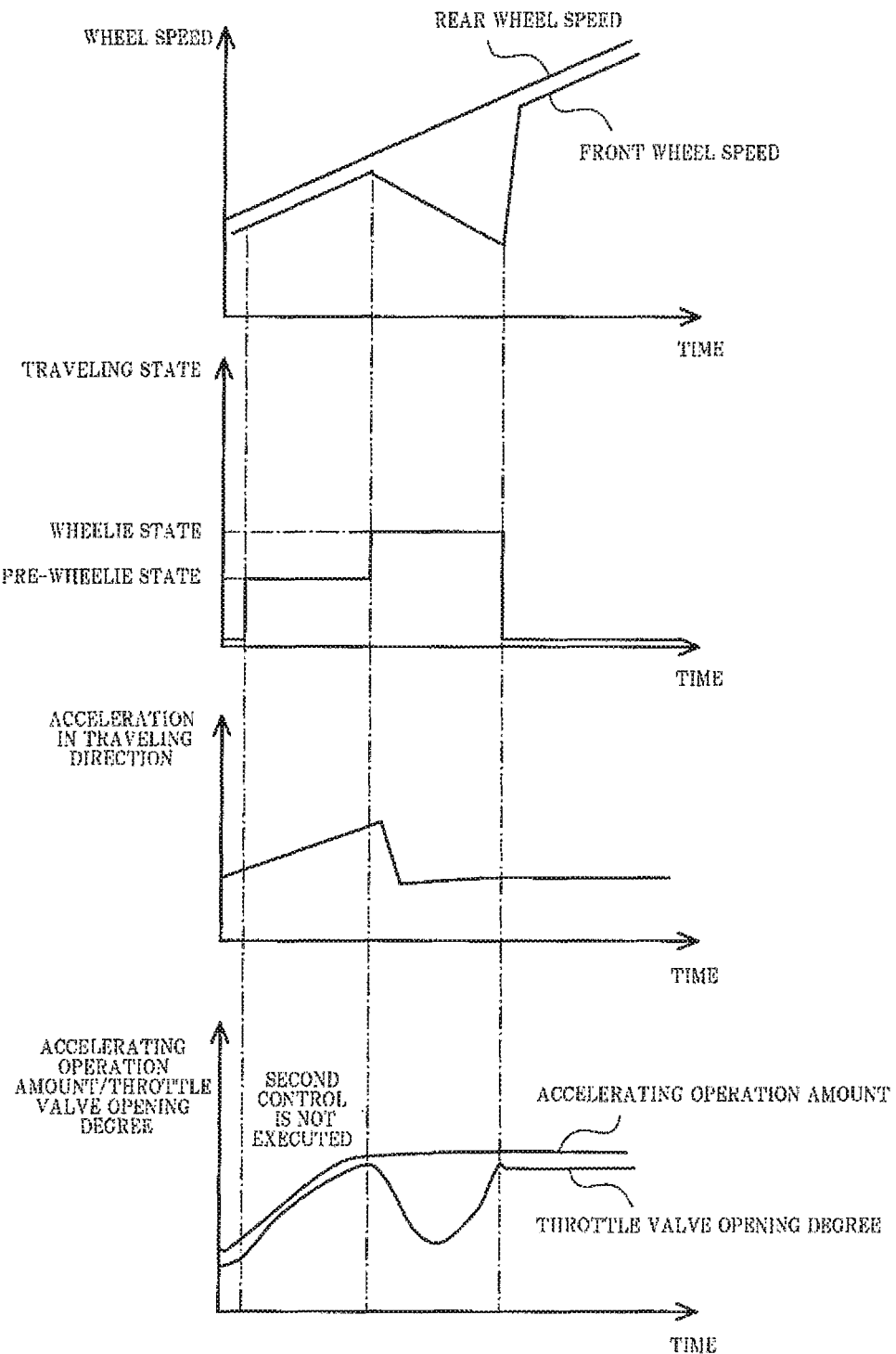
FIG. 10 depicts a graph schematically showing the change over time in the relationship of the throttle valve opening degree versus an operation input in a comparative example where the second control is not executed in the case of FIG. 8.

FIG. 8 depicts a graph schematically showing the change over time in the relationship of the throttle valve opening degree versus the operation input in another example of the second control of the present embodiment. FIG. 10 depicts a graph schematically showing the change over time in the relationship of the throttle valve opening degree versus the operation input in a comparative example where the second control is not executed in the case of FIG. 8. In both of the cases represented by the graphs of FIGS. 8 and 10, the first control (output reducing control) in the wheelie state is executed. Each of FIGS. 8 and 10 depicts the following graphs in order from top to bottom: a graph showing the change over time in wheel speed, a graph showing the change over time in vehicle state, a graph showing the change over time in the acceleration in the traveling direction, and a graph showing the change over time in the relationship of the throttle valve opening degree versus the operation input.

As shown in FIG. 10, when the second control is not executed, the opening degree command value signal is generated as a function of the operation input (accelerating operation amount), and thus the throttle valve opening degree changes with changing operation input. Accordingly, the acceleration in the traveling direction also changes with changing throttle valve opening degree. Thus, if an accelerating operation is performed in the period of the pre-wheelie state, the acceleration in the traveling direction increases. The control for reducing the throttle valve opening degree and therefore the output is performed only after the vehicle is determined to be in the wheelie state. As such, the wheelie amount tends to be so large that the amount of change (the amount of reduction) in throttle valve opening degree is also large. Additionally, the accelerating operation in the pre-wheelie state quickens the entry into the wheelie state.

When the second control is executed, as shown in FIG. 8, the opening degree command value signal is generated such that the opening degree of the throttle valve 41 is controlled to keep the acceleration in the traveling direction at a target acceleration irrespective of the accelerating operation amount. That is, the acceleration of the vehicle 1 in the traveling direction is kept at or around the target acceleration even if the operator performs an operation which would otherwise causes the acceleration of the vehicle 1 in the traveling direction to exceed the target acceleration. As such, the entry into the wheelie state can be more delayed than when the second control is not executed. Further, in the event that the vehicle enters the wheelie state, the wheelie amount can be made smaller than when the second control is not executed, and the amount by which the throttle valve opening degree is reduced in the first control can be small. Thus, the change in throttle valve opening degree can be relatively gentle also in the first control.

Also in this variant, the signal generator 75 acquires the tilt angle (roll angle/bank angle) of the vehicle body 6 and generates the output reducing signal such that the greater the tilt angle of the vehicle body 6 is, the smaller is the degree of the restriction in the second control. More specifically, the signal generator 75 generates the signal such that the greater the tilt angle of the vehicle body 6 is, the higher the target acceleration is.

Other Embodiments

While an embodiment of the present disclosure has been described, the present disclosure is not limited to the above embodiment. Various modifications, changes, and adaptations can be made without departing from the scope of the present disclosure.

For instance, while the above embodiment is an example where it is determined that the first condition is satisfied when all of the three determinations as to the first condition are positive, it may be determined that the first condition is satisfied when at least one of the three determinations as to the first condition is positive. Only one or two requirements (determinations) may be provided to determine whether the first condition is satisfied. For example, it may be determined that the first condition is satisfied when the acceleration of the vehicle 1 in the traveling direction is equal to or higher than the first threshold A.

While the above embodiment is an example where it is determined that the second condition is satisfied when both of the two determinations as to the second condition are positive, it may be determined that the second condition is satisfied when at least one of the two determinations as to the second condition is positive. Only one requirement (determination) may be provided to determine whether the second condition is satisfied. For example, it may be determined that the second condition is satisfied when the acceleration of the vehicle 1 in the traveling direction is equal to higher than the second threshold B.

To determine whether the first or second condition is satisfied, a requirement (determination condition) other than those in the above embodiment may be added. For example, the first or second condition may include a condition that the transmission 5 is in a predetermined gear position where the gear ratio is equal to or higher than a predetermined value or in a gear position lower than the predetermined gear position. This determination condition is based on the fact that the higher the gear ratio is, the greater is the torque generated in the rear wheel 3 which is the drive wheel, and the more likely the vehicle is to enter the wheelie state. The addition of such a requirement allows the first or second control to be executed in a gear ratio range where the wheelie state is likely to occur. As such, erroneous determination can be prevented.

For example, the first or second condition may include a condition that the vehicle 1 is traveling on a specified ground surface. In this case, the first or second determiner 71 or 72 acquires ground surface information about the ground surface on which the vehicle 1 is traveling, and determines whether the ground surface is the specified ground surface based on the acquired ground surface information. The first or second determiner 71 or 72 acquires the ground surface information about the ground surface on which the vehicle 1 is traveling from a ground surface information acquirer 40.

For example, the ground surface information associated with location information is stored in the storage medium of the wheelie suppressing control unit 10. The ground surface information includes, for example, information used to determine whether the ground surface on which the vehicle 1 is traveling is the specified ground surface for determination of whether the second condition is satisfied. For example, the ground surface information acquirer 40 acquires location information such as GPS location information from an external entity and acquires the ground surface information associated with the current location of the vehicle 1 from the storage medium. The first or second determiner 71 or 72 determines whether the ground surface of the current location of the vehicle 1 is the specified ground surface based on the ground surface information acquired by the ground surface information acquirer 40.

For example, the storage medium of the wheelie suppressing control unit 10 may store corner information about a specified traveling section or a specified closed circuit such as a racing circuit. The corner information includes ground surface information associated with a traveling distance from a predetermined location on the specified traveling section or closed circuit. Upon detecting arrival of the vehicle 1 at the predetermined location (such as a starting line) on the specified traveling section or closed circuit based on, for example, a signal received from an external entity, the ground surface information acquirer 40 starts to measure the distance traveled by the vehicle 1 after the detection. When the measured traveling distance reaches a traveling distance corresponding to the distance from the predetermined location to the specified ground surface, the ground surface information acquirer 40 transmits to the first or second determiner 71 or 72 a signal indicating that the ground surface on which the vehicle 1 is traveling is the specified ground surface. Based on this signal, the first or second determiner 71 or 72 determines whether the first or second condition is satisfied.

In this configuration, execution of the first or second control is permitted when the vehicle is traveling on the specified ground surface on which the wheelie state is likely to occur. As such, erroneous determination can be prevented.

In determining whether the first or second condition is satisfied, determinations other than the determinations employed in the above embodiment may be made additionally or may be made instead of at least part of the determinations employed in the above embodiment. For example, it may be determined whether the amount of change in the output of the drive source 4 is equal to or greater than a predetermined threshold. The amount of change in the output of the drive source 4 can be calculated, for example, by detecting the engine speed. In determining whether the first condition is satisfied, it may be determined whether the difference of the front wheel speed from the speed of the vehicle 1 in the traveling direction is equal to or greater than a predetermined threshold. In determining whether the first condition is satisfied, for example, the pitch angle of the vehicle 1 may be detected to determine whether the pitch angle is equal to or greater than a predetermined threshold.

In order to acquire the speed and acceleration of the vehicle 1 relative to the ground, a sensor using radio waves, such as a GPS sensor, may be employed instead of the rear wheel rotational speed sensor 32, and the speed and acceleration of the vehicle 1 relative to the ground may be measured based on detection values of the sensor using radio waves.

While the above embodiment is an example where the drive source 4 is an engine, the drive source 4 may be an electric drive source including an AC motor or a combination of the engine and the electric drive source. The configuration of the output adjusting equipment 8 varies depending on the form of the drive source 4. When the drive source 4 includes an AC motor, the output adjusting equipment 8 includes an inverter electrically connected to the AC motor.

While the above embodiment is an example where the wheelie suppressing control unit 10 is applied to a motorcycle, the wheelie suppressing control unit 10 is applicable to other types of vehicles such as straddle vehicles other than motorcycles.

What is claimed is:

1. A wheelie suppressing control unit comprising processing circuitry, the processing circuitry being configured to:
   determine whether a vehicle including a drive source and an operation member operable to change an output of the drive source is in a traveling state satisfying a first condition representing a wheelie state;
   determine whether the vehicle is in a traveling state satisfying a second condition representing a pre-wheelie state which is a state preceding the wheelie state;
   control the vehicle based on an operation input provided to the operation member;
   upon determining that the first condition is satisfied, execute a first control that reduces the output of the drive source of the vehicle; and
   upon determining that the first condition is not satisfied and that the second condition is satisfied, execute a second control that is different from the first control and that restricts a rate of change of the output of the drive source of the vehicle with respect to the operation input provided to the operation member.

2. The wheelie suppressing control unit according to claim 1, wherein
   the vehicle includes a throttle valve of the drive source,
   an opening degree of the throttle valve is changed based on an opening degree command value signal provided from the processing circuitry,
   the processing circuitry generates the opening degree command value signal provided to the throttle valve based on an operation amount of the operation member, and
   in the second control, the processing circuitry generates the opening degree command value signal such that a change rate of the opening degree of the throttle valve is restricted to be equal to or lower than a predetermined upper limit.

3. The wheelie suppressing control unit according to claim 1, wherein
   the vehicle includes a throttle valve of the drive source,
   an opening degree of the throttle valve is changed based on an opening degree command value signal provided from the processing circuitry,
   the processing circuitry generates the opening degree command value signal provided to the throttle valve based on an operation amount of the operation member, and
   in the second control, the processing circuitry generates the opening degree command value signal such that an acceleration of the vehicle in a traveling direction is adjusted to a predetermined target acceleration.

4. The wheelie suppressing control unit according to claim 1, wherein
   the first condition includes a condition that an acceleration of the vehicle in a traveling direction is equal to or higher than a first threshold, and
   the second condition includes a condition that the acceleration of the vehicle in the traveling direction is equal to or higher than a second threshold lower than the first threshold.

5. The wheelie suppressing control unit according to claim 4, wherein
   the vehicle is a straddle vehicle having a vehicle body tiltable in a direction crossing the traveling direction, and
   the processing circuitry acquires a tilt angle of the vehicle body and sets the first threshold as a function of the tilt angle such that the greater the tilt angle is, the higher the first threshold is.

6. The wheelie suppressing control unit according to claim 4, wherein
   the vehicle is a straddle vehicle having a vehicle body tiltable in a direction crossing the traveling direction, and
   the processing circuitry acquires a tilt angle of the vehicle body and sets the second threshold as a function of the tilt angle such that the greater the tilt angle is, the higher the second threshold is.

7. The wheelie suppressing control unit according to claim 1, wherein the first condition includes a condition that a contraction amount of a front suspension of the vehicle is equal to or smaller than a third threshold, and the second condition includes a condition that the contraction amount of the front suspension of the vehicle is equal to or smaller than a fourth threshold greater than the third threshold.

8. The wheelie suppressing control unit according to claim 1, wherein the vehicle includes a rear wheel as a drive wheel and a front wheel as a driven wheel, and the first condition includes a condition that a difference of an acceleration of the front wheel from an acceleration of the vehicle in a traveling direction is equal to or greater than a fifth threshold.

9. The wheelie suppressing control unit according to claim 1, wherein the vehicle includes a transmission shiftable among a plurality of gear positions, and the first condition or the second condition includes a condition that the transmission is in a predetermined gear position where a gear ratio is equal to or higher than a predetermined value or in a gear position lower than the predetermined gear position.

10. The wheelie suppressing control unit according to claim 1, wherein the processing circuitry acquires ground surface information about a ground surface on which the vehicle is traveling, and determines whether the ground surface is a specified ground surface based on the acquired ground surface information, and the first condition or the second condition includes a condition that the vehicle is traveling on the specified ground surface.

11. The wheelie suppressing control unit according to claim 1, wherein the vehicle is a straddle vehicle having a vehicle body tiltable in a direction crossing a traveling direction, and the processing circuitry acquires a tilt angle of the vehicle body and executes the first control such that the greater the tilt angle of the vehicle body is, the smaller is a degree of the reduction in the output of the drive source.

12. The wheelie suppressing control unit according to claim 1, wherein the vehicle is a straddle vehicle having a vehicle body tiltable in a direction crossing a traveling direction, and the processing circuitry acquires a tilt angle of the vehicle body and executes the second control such that the greater the tilt angle of the vehicle body is, the smaller is a degree of the restriction in the second control.

13. The wheelie suppressing control unit according to claim 1, wherein the vehicle includes a vehicle body, a rear wheel as a drive wheel, and a front wheel as a driven wheel, the wheelie state is a state where the front wheel is raised off a ground surface, the pre-wheelie state is a state where the front wheel is not raised off the ground surface, the processing circuitry calculates a wheelie amount, the wheelie amount being an amount of change in angular position of the vehicle body in a rotational direction in which the front wheel comes off the ground surface, and in the first control, the processing circuitry controls the output of the drive source such that the greater the wheelie amount is, the greater is an amount by which the output of the drive source is reduced.

\* \* \* \* \*